US007435375B1

(12) United States Patent
Johnston et al.

(10) Patent No.: US 7,435,375 B1
(45) Date of Patent: Oct. 14, 2008

(54) ANNEALING FURNACE PURGING AND OXIDATION SYSTEM AND METHOD

(75) Inventors: Gwynne Johnston, Barrington Hills, IL (US); Michael E. Kubis, Lake Villa, IL (US)

(73) Assignee: Tampel Steel Company, Chicago, IL (US)

( * ) Notice: Subject to any disclaimer, the term of this patent is extended or adjusted under 35 U.S.C. 154(b) by 0 days.

(21) Appl. No.: 11/758,085

(22) Filed: Jun. 5, 2007

Related U.S. Application Data

(62) Division of application No. 10/858,185, filed on Jun. 1, 2004, now Pat. No. 7,361,238.

(51) Int. Cl.
*B32B 15/01* (2006.01)

(52) U.S. Cl. ....................................... 266/252; 266/250

(58) Field of Classification Search ................. 266/250, 266/252
See application file for complete search history.

(56) References Cited

U.S. PATENT DOCUMENTS 6,221,501 B1 * 4/2001 Blotzer et al. ............... 148/208

OTHER PUBLICATIONS

Two Drawings of a Dec. 1998 prior art lamination furnace for annealing laminations.
Effective Cooling of Components in Continuous Nitrogen-Hydrogen Atmosphere Furnace—Garg et al Industrial Heating/Feb. 1997.

* cited by examiner

*Primary Examiner*—Scott Kastler
(74) *Attorney, Agent, or Firm*—Schiff Hardin LLP

(57) ABSTRACT

In an improved annealing furnace for laminations having a purge vestibule and an oxidation section, atmosphere injection tubes with atmosphere injection jets are provided in the oxidation section at a conveyor directly beneath trays conveying the laminations. Atmosphere extraction tubes are also provided along with a fan which draws atmosphere from the extraction tubes and provides a pressure output to the atmosphere injection tubes. The speed of the fan may be variable.

20 Claims, 2 Drawing Sheets

PORTION OF ANNEALING FURNACE
OXIDATION SECTION
PURGE VESTIBULE
INFRARED PYROMETER
COMPUTER
TO COOLING SECTION FAN
COOLING SECTION FAN
FROM HEATING AND COOLING SECTION
TO AIR COOLING SECTION
PRODUCT FLOW
II
II
10
11
12
12A
13
13A
14
15
16
16
17
18
18A
19
20
21
22
23
24
25
25A
26
27
29
30
31
33
34
35
36
300
400

ANNEALING FURNACE PURGING AND OXIDATION SYSTEM AND METHOD

RELATED APPLICATIONS

The present application is a divisional application of parent application Ser. No. 10/858,185, now U.S. Pat. No. 7,361,238, filed Jun. 1, 2004, inventors Gwynne Johnston and Michael E. Kubis.

This application is also related to Ser. No. 10/857,824 titled: "Improved Annealing Furnace Cooling And Purging System And Method," filed Jun. 1, 2004, inventors Gwynne Johnston and Michael E. Kubis, and a divisional application of that application Ser. No. 11/758,092, titled: "Improved Annealing Furnace Cooling And Purging System And Method" filed Jun. 5, 2007.

BACKGROUND

Steel laminations are typically annealed in continuous roller hearth furnaces to improve magnetic properties. The known prior art furnace includes heating and cooling sections followed by a purging vestibule and an oxidation section.

Motors, transformers and other electrical devices typically comprise an assembly of precision stamped steel parts called laminations. The steel laminations form the magnetic path which allows transfer of magnetic flux.

The performance of laminations depends on the magnetic properties of the steel used to make the laminations. Typically the best magnetic properties are achieved following heat treatment or annealing of the laminations after stamping.

In the prior art, rows of laminations are typically loaded onto trays for processing through a continuous roller hearth furnace. As a result of the difference and variations in size and shape, special practices and precautions are required with respect to loading to ensure uniformity of heat treatment during the annealing operation.

It is known in the prior art to provide a purge or transfer vestibule to separate atmosphere in the controlled cooling and heating sections of the furnace from ambient conditions. The atmosphere in the cooling section comprises a decarburizing gas mixture subject to ignition or explosions when mixed with air. The function of the purge or transfer vestibule is to provide an inert atmosphere barrier so that laminations may be removed from the potentially explosive gas mixture without contact with air. Operating conditions for the purge section or vestibule usually require that the static pressure is maintained at values slightly higher than the static pressure of the controlled cool section to minimize leaks of potentially explosive gas.

It is also known in the prior art to create or form a blue/gray oxide on the surface of the steel laminations after the cooling section and purge vestibule in the oxidation section which follows. This oxide serves to provide a measure of electrical insulation for each of the laminations. The oxide is known to be formed in the prior art in the controlled oxidation section of the furnace. The composition of the oxide is a complex mixture of $Fe_2O_3$ and $Fe_3O_4$. Control of uniform appearance or cosmetics of the laminations is important and difficult to achieve. One of the main rate limiting steps in this process is the diffusion of the oxidation species between the faces of the laminations, which are wired together in rows. When controlled oxidation sections are used in the prior art in an annealing furnace, it is normal practice to use a mixing or recirculating fan so that the atmosphere can circulate and fully react with all surfaces of the steel laminations. It is known in the prior art that optimum temperatures for oxidation of steel to form a blue/gray reaction product range from 600 to 1000° F. Typical resident times exceed twenty minutes since the rate of oxidation, and therefore thickness of the oxide, depends on the rate of diffusion of oxygen through the oxide layer as it is formed.

After reaction to form a controlled oxide on the surface of the steel, the laminations are allowed to cool in air to a temperature that permits manual handling.

In the prior art oxidation section, it is a conventional practice to use paddle fans on the roof of the oxidation section to provide mixing and circulation of the oxidized atmosphere.

SUMMARY

It is an object to improve uniformity of oxide formation in the oxidation section of the annealing furnace, and to improve overall efficiency of the oxidation section.

With the disclosed system and method, at least one atmosphere injection tube with atmosphere injection jets is introduced into the oxidation section which disrupts the boundary layer, resulting in improved efficiency and uniformity of oxide formation.

DESCRIPTION OF THE PREFERRED EMBODIMENTS

Figure 1:
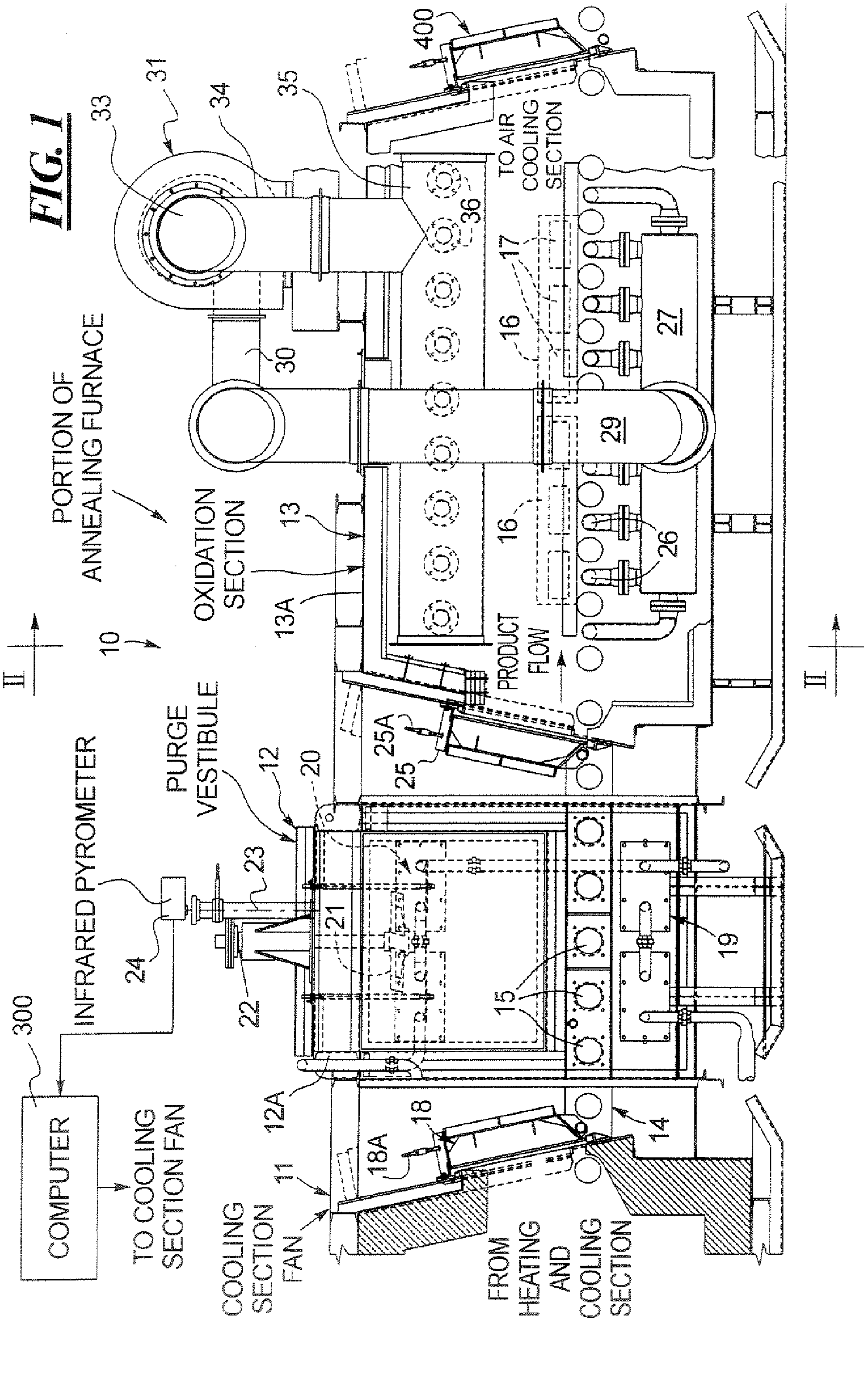
FIG. 1 is a side view of a purge vestibule and oxidation section portions of an annealing furnace for laminations.

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In a co-pending application by the same inventors entitled "Improved Annealing Furnace Cooling and Purging System and Method" filed of even date herewith and incorporated herein by reference, an improved system and method is described for improving the efficiency of the cooling section in combination with the purge vestibule. In this co-pending application, a precise control over a temperature of the cooled laminations delivered into and from the purge vestibule 12 shown in FIG. 1 of the present application is accomplished by use of a pyrometer 24 measuring temperature of the laminations in the purge vestibule 12. Preferably the lamination temperature prior to entering the oxidation section 13 is in a range from 600 to 1000° F.

A portion of an annealing furnace for laminations is shown at 10 in FIG. 1. Laminations arriving from the furnace cooling section 11 are delivered to the purge vestibule 12. From the purge vestibule 12 the laminations continue on through the oxidation section 13 and are output to the air cooling section through cooling section door 400.

Laminations are transferred from the furnace cooling section 11 through the purge vestibule 12 and through the oxidation section 13 by a powered conveyor 14 having rollers 15 externally driven by gears 9. The laminations 17 are contained within metal trays 16.

From the cooling section 11, the trays pass through a furnace door 18 controlled by a cable 18A.

The purge vestibule 12 includes a container 12*a* having below a ceiling a recirculation fan 21 driven by a motor at 22. Also at the roof is an opening 23 at which a temperature of the laminations inside the purge vestibule 12 can be measured by one or more infra-red pyrometers 24. The pyrometer 24 connects to a computer 300 which controls an atmosphere extraction and pressurization fan in the cooling section as described in the co-pending application to insure that the laminations arrive at the purge vestibule with a temperature in a range from 600 to 1000° F.

The purge vestibule 12 contains a cooling tube assembly 19 having a plurality of cooling tubes which preferably convey water and are finned tubes. These are positioned at a bottom portion of the chamber 12A. At a top portion of the chamber 12A, an additional water finned tube assembly 20 having a plurality of cooling tubes is provided. The water for these finned tubes may come from water used to cool tubes in the furnace cooling section 11 as described in the copending application.

Although water is preferred in the cooling tubes described above and hereafter, other cooling fluids may be employed such as air.

At the output side of the purge vestibule 12, an oxidation door 25 is provided controlled by a cable 25A.

Figure 2:
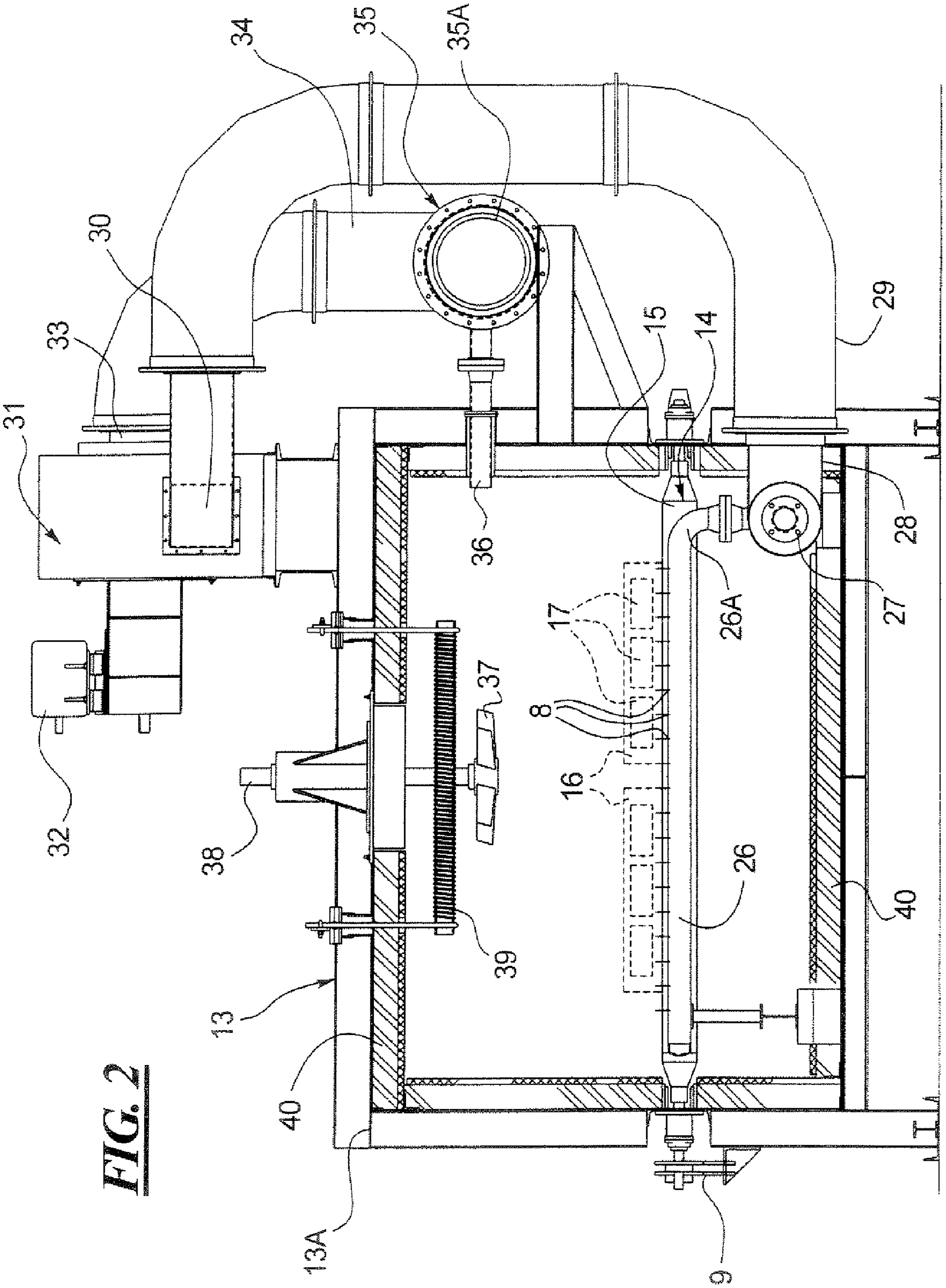
FIG. 2 is a cross-sectional view taken along line II-II of FIG. 1.

The oxidation section 13 is formed of a chamber 13A which can also be seen in FIG. 2. The container 13A has insulation 40 at the walls. Also heating elements 39 are provided at the roof of the chamber 13A for the oxidation process. A recirculation fan 37 is provided driven by a motor at 38.

Within the oxidation section 13 and between the rollers 15 of the conveyor 14 are provided a plurality of atmosphere injection tubes 26, with each tube having at its top surface a plurality of atmosphere injection jets 8. Significantly, the atmosphere injection tubes 26 are mounted very close to the bottom and sides of the trays 16 since the tubes are positioned between the rollers 15. This is accomplished by an L section 26A which joins the tubes 26 to a pressure manifold 27 lying within the chamber 13A. The pressure manifold 27 passes through an aperture 28 in a sidewall of the chamber 13A to an insulated pressure duct work 29 which connects to a fan exhaust 30 of the high temperature fan 31. Fan 31 is driven by a variable speed drive motor 32. At an entrance 33 to the high temperature fan 33, an insulated pressure duct work 34 connects. The bottom end of the duct work 34 connects to a suction manifold 35 having an insulated material 35A peripherally located therein. Suction manifold 35 connects to a plurality of atmospheric extraction tubes 36 along a row at a top portion of the chamber 13A.

By precise control of temperature of the laminations entering the purge vestibule 12 from the cooling section 11 (between 600° F. and 1000° F.), the blue/gray oxide in the oxidation section can be formed without cosmetic problems. This precise temperature control occurs via the infra-red pyrometer 34 feeding back to the cooling section pressurization fan variable speed motor as described in the copending application incorporated herein. Combined with the paddle fins at the roof of the oxidation section, the application of the atmosphere injection jets provides a thorough mixing and circulation of the oxidizing atmosphere. Since the jets are located between the furnace conveyor rollers, turbulence is created in the oxidizing atmosphere immediately adjacent the lamination stack surfaces and between the individual laminations. This turbulence disrupts a stagnant boundary layer at surfaces of the lamination stacks. The process provides both a reactive atmosphere for oxidation and additional uniform cooling in view of the jets directly adjacent the bottom and near the sides of the trays carrying the laminations. Also, the additional cooling by water in the cooling tubes in the purge vestibule 12 combined with the improved oxidation section efficiency, results in a further increased overall efficiency and production rates through the furnace. Also the variable speed drive motor 32 of the high temperature fan 31 of the oxidation chamber can be manually or automatically adjusted to adjust oxidation conditions for a given production rate.

Also in view of the increased oxidation efficiency combined with increased cooling section efficiency described in the co-pending application, both the cooling and oxidation sections can be shortened when retro-fitting an existing annealing furnace. This thus allows an increase in the length of the heating section and thus an overall increase in conveyor speed resulting in a 20-30% increase in production (efficiency).

The atmosphere injection jets allow for oxidation species to diffuse between the surfaces of the laminations to form an improved controlled blue/gray oxide in the controlled oxidation section 13. By providing the temperature of the laminations entering the oxidation section at between 600 and 1000° F., the appearance of the laminations is improved.

The atmosphere injection jets preferably are an opening in the top of the atmosphere injection tubes. The size of the opening defines the jet characteristics. The opening or orifice may also take other forms such as nozzles.

The velocity profiles of the jets are a function of differential pressure and diameter of the orifice. The velocity decays as a function of the square of the distance from the orifice. Thus the distance of the jet from the work tray containing the parts to be oxidized is important.

With the present system and method, the atmosphere injection jets provide turbulence of the oxidizing gas at the surface of the laminations to disrupt the stagnant boundary layer and provide a reaction component both for the surface of the laminations and to replenish the reaction component required for oxidation between the laminations. The jets provide additional reaction components as well as additional cooling, thus compensating for higher entry temperatures into the oxidizing section, increased under-cooling of the surface, and as a result increased production rates.

With the present system and method, the difficult to achieve uniform oxidation on the surface of the rows of the laminations in the controlled oxidation section is achieved along with increased cooling in an optimized way, particularly when the laminations are wired together. With the present system and method, the oxidizing medium can diffuse uniformly between the small gap between each lamination, and then diffuse through any oxide reaction layer before reacting with the base steel. Also, because of the increased cooling in the oxidation section, an air-cooling section following the oxidation section can be shortened.

An advantage of the present system is that it can be retrofitted to an existing annealing furnace already having the purge vestibule of the circulating fan and already having a recirculation fan in the oxidation section. Cooling tubes 20, 21 are added to the purge vestibule 12 and the atmosphere injection tubes 26 with the atmosphere injection jets 8 along with the atmosphere extraction tubes 36 and controlled high temperature fan 31 with associated ducting 29, 34 and manifolds 27, 35 are added to retrofit the furnace.

With the present system, the velocity of the jet increases the rate of penetration of the reacting species between the laminations to achieve the desired oxidation.

The result is a significant improvement in uniformity and penetration of oxide coating between the laminations. Significantly, process control may be achieved by varying the speed of the fan to adjust and vary the velocity of the jets causing turbulence at the tray laminations. The speed of the fan may be adjusted manually or automatically.

More than one internal mixing fan may be provided in the purge section and/or the oxidation section.

The insulated duct works previously described may include refractory insulated material.

Significantly, the atmosphere injection tubes are located between the furnace rollers of the conveyor as close as possible to the centerline of the rollers and thus as close as possible to the bottom of the trays of laminations. The atmosphere injection tubes could also be provided directly at sides or directly over the conveyor and trays.

The internal diameter of the atmosphere injection tubes 26 is chosen so that uniform pressure exists at each hole or jet 8. The design of the orifice is not limited to circles or holes and may be rectangles are more complex fan designs.

By locating the pressure manifold 26 within the oxidation chamber, by use of the previously described L section 26A the atmosphere injection tubes 26 may be located between the conveyor rollers and directly beneath the trays.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

We claim:

1. A lamination annealing furnace, comprising:

a heating section followed by a cooling section, purge vestibule, and oxidation section;

a conveyor for conveying trays containing laminations to be annealed, said conveyor extending from said heating section through said cooling section, purge vestibule, and oxidation section;

said oxidation section comprising a plurality of atmosphere injection tubes with each tube having a plurality of atmosphere injection jets positioned closely adjacent to the trays; and said oxidation section further comprising at least one atmosphere extraction tube connected to an input of a fan, an output of the fan being connected to said atmosphere injection tubes.

2. A furnace of claim 1 further comprising a recirculation fan in said oxidation section.

3. A furnace of claim 1 wherein at least one heating element is provided in said oxidation section.

4. A furnace of claim 1 wherein said fan is controlled by a variable speed drive motor and a plurality of said extraction tubes are provided.

5. A furnace of claim 1 wherein said oxidation section has a chamber, said fan is a high temperature fan in said chamber, and said injection tubes lie underneath said trays.

6. A furnace of claim 1 wherein a pressure manifold is provided inside a chamber of said oxidation section and said atmosphere injection tubes connect to said pressure manifold, and wherein an insulated duct work connect the pressure manifold to said output of said fan.

7. A furnace of claim 4 wherein a suction manifold is connected to said plurality of atmosphere extraction tubes, said suction manifold being positioned outside a chamber of said oxidation section, and wherein insulated duct work connects said suction manifold to said input of said fan.

8. A furnace of claim 1 wherein said fan comprises a high temperature fan.

9. A furnace of claim 1 wherein said atmosphere injection jets comprise holes in said atmosphere injection tubes.

10. A furnace of claim 1 wherein said atmosphere injection tubes run in a direction perpendicular to a conveying direction of said trays, said conveyor comprising a plurality of rollers having spaces therebetween, and in at least some of said spaces respective atmosphere injection tubes being positioned between adjacent rollers.

11. A furnace of claim 1 wherein respective L-shaped sections connect respective atmosphere injection tubes to a manifold located inside a chamber of said oxidation section.

12. A furnace of claim 1 wherein said purge vestibule comprises at least one cooling tube in a chamber of said purge vestibule, said purge vestibule having at its input a furnace door and at its output an oxidation door.

13. A furnace of claim 12 wherein said cooling tube conveys a cooling fluid.

14. A furnace of claim 12 wherein said cooling tube is finned.

15. A furnace of claim 1 wherein one set of cooling tubes is provided beneath said conveyor in said purge vestibule and another set of cooling tubes is provided above said conveyor in said purge vestibule.

16. A furnace of claim 1 wherein a recirculation fan is provided in a chamber of said purge vestibule.

17. A furnace of claim 1 wherein said purge vestibule has a sensor which measures a temperature of laminations in said purge vestibule.

18. A furnace of claim 17 wherein said purge vestibule has an opening with an infra-red pyrometer at said opening to measure a temperature of atmosphere inside said purge vestibule.

19. A furnace of claim 1 wherein said furnace cooling section and purge vestibule cool said laminations in said trays to a temperature lying in a range from 600 to 1000° F. prior to entry into the oxidation section.

20. A lamination annealing furnace, comprising:

a heating section followed by a cooling section, purge vestibule, and oxidation section;

a conveyor for conveying trays containing laminations to be annealed, said conveyor extending from said heating section through said cooling section, purge vestibule, and oxidation section;

said oxidation section comprising a plurality of atmosphere injection tubes each having a plurality of atmosphere injection jets and positioned between rollers of said conveyor underneath the trays;

said oxidation section further comprising atmosphere extraction tubes being connected to an input of a fan, an output of the fan being connected to said atmosphere injection tubes, and a variable speed motor driving said fan; and a re-circulating fan in said oxidation section above said conveyor.

* * * * *

UNITED STATES PATENT AND TRADEMARK OFFICE

CERTIFICATE OF CORRECTION

PATENT NO. : 7,435,375 B1
APPLICATION NO. : 11/758085
DATED : October 14, 2008
INVENTOR(S) : Gwynne Johnston and Michael E. Kubis It is certified that error appears in the above-identified patent and that said Letters Patent is hereby corrected as shown below:

On the Title page of the Patent, the name of the Assignee is incorrectly spelled: please correct at (73) Assignee: Tampel Steel Company, Chicago, IL (US) to read --(73) Assignee: Tempel Steel Company, Chicago, IL (US)--

Signed and Sealed this

Sixth Day of January, 2009

JON W. DUDAS
*Director of the United States Patent and Trademark Office*